W. L. CLOUSE.
NUT BURRING MACHINE.
APPLICATION FILED JUNE 20, 1910.

989,119.

Patented Apr. 11, 1911.

2 SHEETS—SHEET 1.

Witnesses

William L. Clouse
Inventor,
by C. A. Snow & Co.
Attorneys.

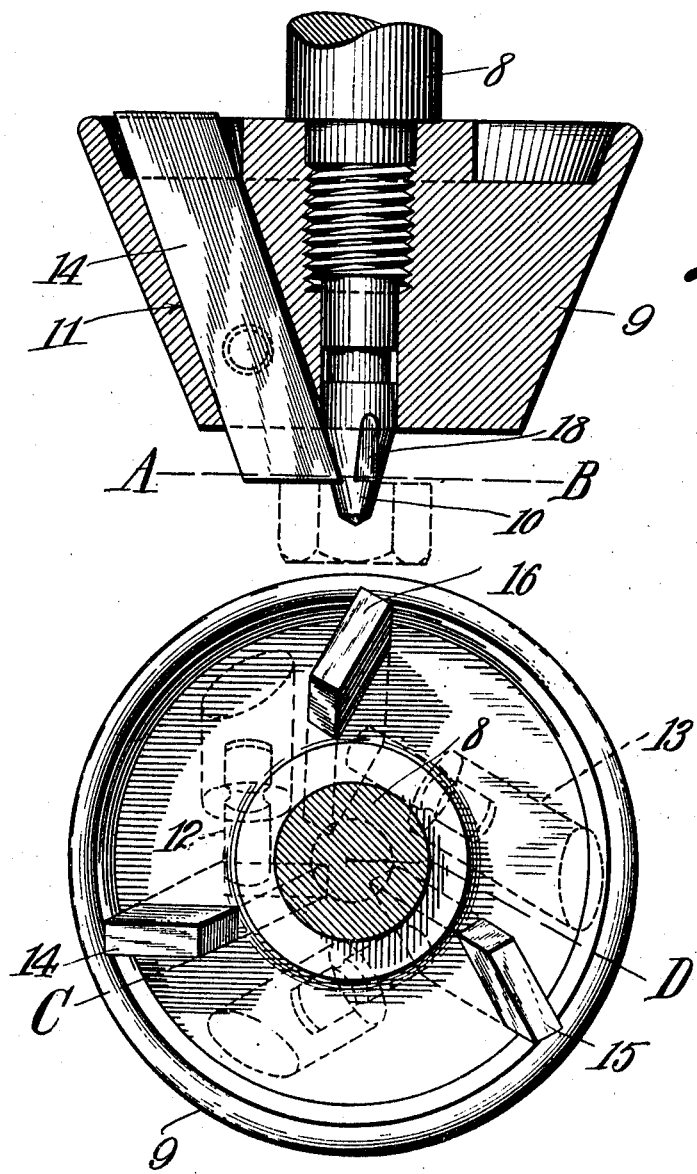

UNITED STATES PATENT OFFICE.

WILLIAM L. CLOUSE, OF TIFFIN, OHIO, ASSIGNOR TO NATIONAL MACHINERY CO., OF TIFFIN, OHIO.

NUT-BURRING MACHINE.

989,119.  Specification of Letters Patent.  Patented Apr. 11, 1911.

Application filed June 20, 1910. Serial No. 567,936.

*To all whom it may concern:*

Be it known that I, WILLIAM L. CLOUSE, a citizen of the United States, residing at Tiffin, in the county of Seneca and State of Ohio, have invented a new and useful Nut-Burring Machine, of which the following is a specification.

This invention has reference to improvements in machines for burring nuts, especially nut blanks, coming from a hot pressed nut machine.

In nut making machines where the nut blanks are pressed hot the wear of the cutting and punching tools causes the production on the nut of a rough fin or bur around the outer edges of the nut and around the central passages therethrough. It is practically impossible to make nuts without these fins or burs and therefore the removal of the fin or bur becomes an important and regular operation in the manufacture of nuts. Heretofore the removal of the fin or bur has been attended by certain troubles, principally in that the fin or bur is pushed over the edge of the nut instead of being cut off clean by the burring machine.

It is the object of the present invention to provide means whereby the burring operation results in a clean finish of the face of the nut acted upon so that the bur is completely removed and not either in part or in whole pushed over the edge of the nut. This is accomplished by an arrangement of cutting tools acting on the nut in a manner to dress the face of the nut acted upon completely.

The invention will be best understood from a consideration of the following detail description taken in connection with the accompanying drawings forming a part of this specification, in which drawings:—

Figure 1:
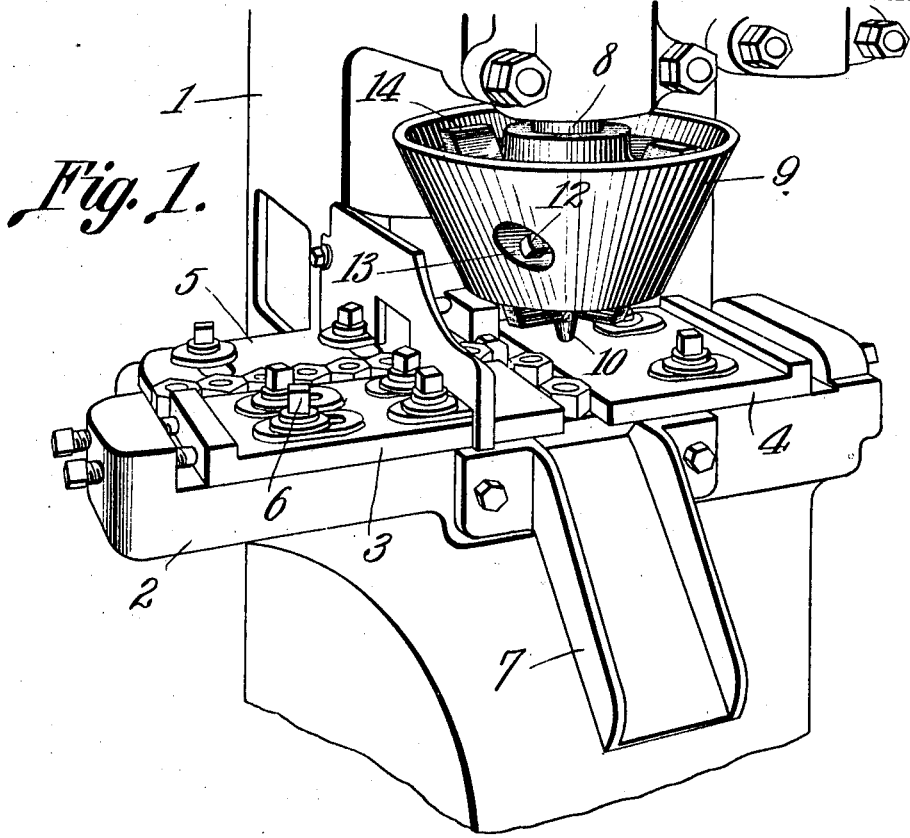
Figure 2:
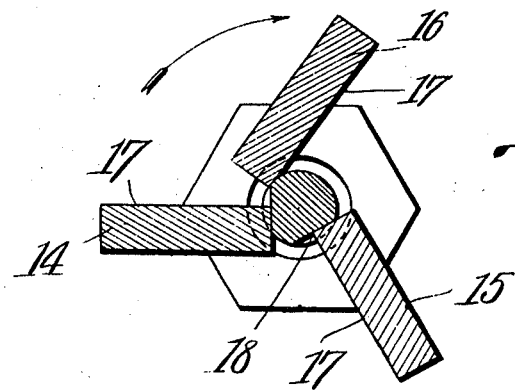

Figure 1 is a perspective view of a cutter head constructed in accordance with the present invention and so much of a nut burring machine as is necessary to show the relation of the cutter head to the nuts being acted upon. Fig. 2 is a section on the line A—B of Fig. 3, showing a nut in position. Fig. 3 is a section on the line C—D of Fig. 4 with the cutter head spindle in elevation. Fig. 4 is a plan view of the structure of Fig. 3 with the cutter head spindle shown in cross section.

Referring to the drawings there is shown in Fig. 1 the body 1 of a nut burring machine provided with a table 2 upon which latter are mounted guide plates 3, 4, 5, which may be adjusted and held in the adjusted position by clamp bolts or screws 6 to form channels for the passage of the nuts to be treated, and after treatment the nuts are directed to a chute 7 from which the finished nuts, so far as the present machine is concerned, are delivered into a suitable receptacle.

Mounted in the body of the machine is a spindle 8 which, as is common in machines of this character is capable of longitudinal movement and has rotative movement on its longitudinal axis imparted to it by means of any suitable mechanism which it is not deemed necessary to illustrate. The spindle is shown as mounted to turn on a vertical axis and at the lower end carries a cutter head 9, beyond which the spindle projects as indicated at 10, this projecting portion being tapering or conical.

Formed through the cutter head 9 are passages 11 shown as three in number and substantially equidistant one from the other. These passages diverge one from the other from the lower end of the cutter head toward the upper end thereof, being open at each end and entering each passage is another passage for the reception of a suitable set screw 12, the outer end of the passage for the set screw being counter-sunk as indicated at 13 so that the set screw may be entirely housed in the counter-sunk portion leaving the outer surface of the cutter head free from projections. Since the passages 11 converge toward the lower ends, the outer face of the cutter head may be conical or tapering. In addition to the divergent inclination of the passages 11 they also have a retrograde inclination with reference to the direction of rotation of the cutter head, this direction of rotation being clockwise as viewed in Fig. 4. Each passage 11 receives a cutter and since there are three passages shown in the cutter head these cutters are for convenience of description designated by the reference numerals 14, 15, 16, respectively. Each cutter may consist of a bar of metal of rectangular cross section fitted to the respective passage 11, each passage being of like rectangular cross section. The lower or cutting edge of each tool 14, 15, 16, is so shaped that the lower ends of the three tools are all in the same plane perpendicular to the longitudinal axis of the spindle or arbor 8. The inclination of each tool with relation to the axis of rotation gives to the tool the appropriate rake to make the forward or cutting edge of the tool an acute angle. Two of the tools, namely the tools 14 and 15 have the cutting edges 17 radial to the axis of rotation and those portions of the tools closest to the axis of rotation are inset into the conical end 10 of the spindle 8. For this purpose the conical end 10 of the spindle is formed with notches 18 receptive to the corresponding portions of the tools 14 and 15. The tool 16 however is so positioned that its cutting edge 17 is tangential to a circle concentric with the axis of rotation of the spindle or arbor 8 and this circle may be substantially coincident with the surface of the conical end 10 of the arbor or spindle 8 which may be engaged by the cutting edge of the tool 16. The length of each cutting edge 17 is sufficient to extend from the end 10 of the arbor 8 to a point well beyond the perimeter of the largest nut to be treated in the machine.

Since what may be termed the rear face of the nut blank is the one having the fins or burs thereon, these fins or burs projecting from the rear face of the nut in the general direction of the longitudinal axis of the nut, the nuts are placed upon the table 2 in the passage ways between the plates 3, 4 and 5, with the rear face uppermost, and the passage way between the plates 3 and 4 is so adjusted that the nuts may be moved one by one beneath the cutter head 9 so that when the latter is lowered the conical end 10 of the spindle 8 will enter the central perforation of the nut blank thus holding the nut while the active ends of the tools 14, 15 and 16 are brought into engagement with the rear face of the nut, the said nut being prevented from rotating by the engagement of the adjacent edges of the plates 3 and 4 with opposite sides of the nut blank, it being understood that such nut blank is commonly hexagonal or square, although the burring machine will operate with nuts of other shapes.

As will be seen from Fig. 2 the cutting edges 17 of the cutters or tools 14, 15 and 16 overlap the inner wall of the nut blank so that the bur there produced is readily cut away by the tools 14, 15 and 16. These tools also extend beyond the perimeter of the nut and the bur there produced is also readily cut away. Any tendency of the radial cutters 14 and 15 to out-turn the bur or fin rather than cut the same from the nut is overcome by the tangential cutter or tool 16 which tends to direct the fin or bur toward the center of the nut blank. The cutter head is rotated and at the same time moves toward the nut so that the fin or bur both at the outer and inner edges of the nut blank is cut away and the face of the nut is dressed down to the desired point. It is found advisable to set certain of the cutters so that their cutting edges radiate from the axis of rotation so as to remove the central bur about the hole of the nut, while the cutter 16 is set tangentially as described, so as to draw in the marginal bur upon the nut instead of tending to push the bur over the edge of the nut as is the tendency with the cutters 14 and 15. Furthermore the tilting of the cutters in retrograde relation to the direction of rotation results in freer cutting than when the cutters have no rake.

What is claimed is:—

1. In a nut burring machine, a rotatable cutter head, and cutters thereon having their cutting edges all in the same plane perpendicular to the axis of rotation of the cutter head, said cutters diverging from the axis of rotation in a direction away from the active ends of the cutters and having a rake with relation to the direction of rotative movement, the cutting edges of the cutters being respectively in radial relation to the axis of rotation and in tangential relation to a circle concentric with the axis of rotation.

2. In a nut burring machine, a rotatable cutter head, and cutters thereon having their cutting edges respectively radial to the axis of rotation and tangential to a circle concentric with the axis of rotation.

In testimony that I claim the foregoing as my own, I have hereto affixed my signature in the presence of two witnesses.

WILLIAM L. CLOUSE.

Witnesses:
 EARL C. KNAPP,
 WALLER N. CLOUSE.